May 5, 1925. 1,536,421

W. C. CARROLL

EXHIBITION OF MOTION PICTURES AND THE LIKE IN DAYLIGHT

Filed Nov. 20, 1924

Inventor-
W. C. Carroll
By
Atty.

Patented May 5, 1925.

1,536,421

UNITED STATES PATENT OFFICE.

WILLIAM C. CARROLL, OF ST. KILDA, VICTORIA, AUSTRALIA.

EXHIBITION OF MOTION PICTURES AND THE LIKE IN DAYLIGHT.

Application filed November 20, 1924. Serial No. 751,123.

*To all whom it may concern:*

Be it known that I, WILLIAM CONRAD CARROLL, electrical engineer, a subject of the King of Great Britain and Ireland, residing in the city of St. Kilda, in the county of Bourke, State of Victoria, Commonwealth of Australia, whose post-office address is Victory Picture Theatre, Carlisle Street, in the said city of St. Kilda, in the county of Bourke, State of Victoria, Commonwealth of Australia, have invented certain new and useful Improvements Relating to the Exhibition of Motion Pictures and the like in Daylight, of which the following is a specification.

This invention relates particularly to the exhibition in daylight of cinematograph pictures or announcements and is also applicable to the daylight exhibition of similar luminous signs such as lantern slides.

I have ascertained by experiment that motion pictures and the like may be exhibited successfully in daylight by projecting the pictures onto a screen which holds a suitable liquid, semi-liquid or like impregnating substance in mechanical suspension and the primary object of the present invention is to provide a method of exhibiting motion pictures and the like in daylight which embodies this characteristic feature. The screen is of an absorbent nature and may be maintained in the desired moistened or saturated condition when in use by the continuous application thereto of a suitable liquid or solution which renders the screen translucent to the light rays of a cinematograph or like machine as hereinafter described.

A further object of the invention is to provide simple compact and inexpensive apparatus operating in accordance with the above method and especially suited for advertising purposes. Such apparatus may be constructed and arranged to form a portable self contained unit adapted for continuously and automatically exhibiting illustrations projected from a cinematograph film onto a screen forming part of the unit. Alternatively the apparatus may be arranged to project the pictures or announcements onto the screen from a comparatively long range and if desired may be adapted for manual operation.

Referring to the drawings which form part of this specification:—

In accordance with the invention motion pictures, and like luminous illustrations or announcements, may be projected from cinematograph films or lantern slides any suitable form of cinematograph or magic lantern being employed as the source of projection. In all instances the pictures or the like are thrown onto a screen by which a suitable liquid or semi-liquid substance is held in mechanical suspension so as to saturate or dampen the screen and render it suitable for the purpose in view. This screen may be of textile, fibrous, or like material which will readily absorb the liquid or like impregnating substance and in this respect I have found that thin but relatively strong or tough paper having a matte surface will afford satisfactory results.

It has been found that paraffin oil is particularly satisfactory as a liquid for impregnating the absorbent screen, or a relatively thick or semi-liquid solution prepared by dissolving petroleum jelly in paraffin oil may be used with equally effective results and is not liable to dry so quickly on the screen. It is to be distinctly understood however that various other liquid semi-liquid or like substances or solutions preferably of an oily nature may be employed with effective results and without departing from the scope of the invention and the appended claims.

Figures 1, 2:
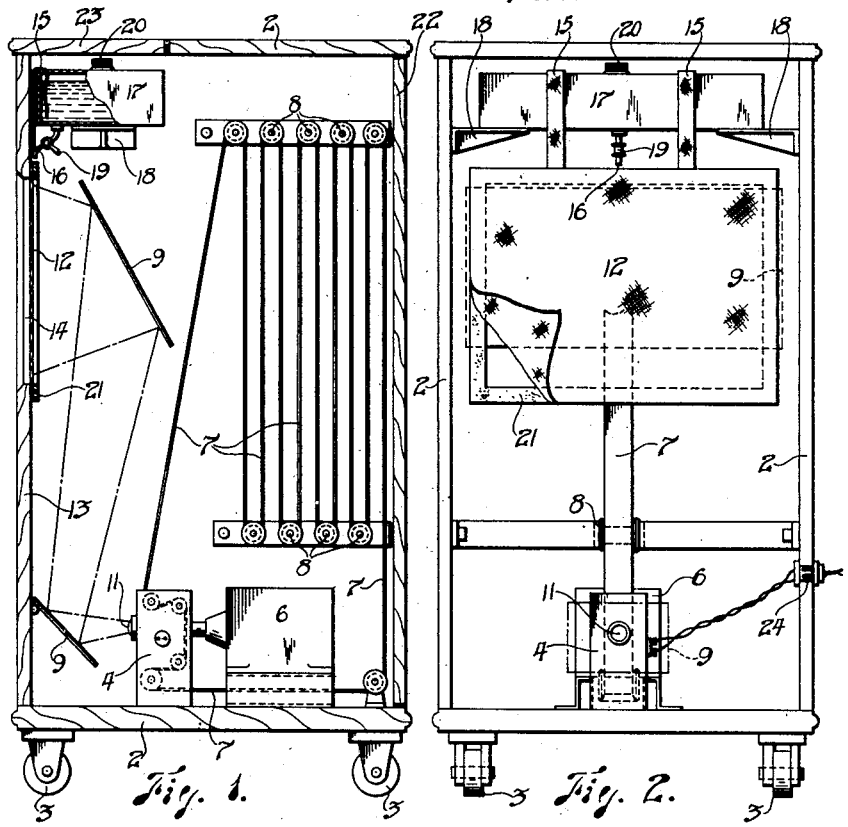
Figure 1 is a vertical section of suitable apparatus for carrying out the invention the apparatus being automatic in action and arranged within a portable cabinet to thereby form a self contained unit which may be easily moved from place to place.
Figure 2 is a front view of the apparatus seen in Figure 1 the front wall of the cabinet being removed. Certain parts are indicated in broken lines and other parts are omitted for convenience of illustration.

Referring now to the drawings which are to be taken merely as examples of the practical application of the invention, Figures 1 and 2 show a portable apparatus including a box or cabinet 2 of suitable size and shape which may be equipped with wheels or castors 3.

Accommodated within the cabinet 2 is a cinematograph or motion picture machine which may include suitable operating mechanism indicated at 4 and a lantern indicated at 6. A relatively low candle power illuminant such as is usually employed for night cinematographs may be used. The mechanism 4 and lantern 6 may be disposed near the bottom of the cabinet 2 or otherwise as desired, and when it is intended that the apparatus should operate automatically as in displaying advertisements, an endless band of film 7 may be continuously moved through the machine.

The continuous film 7 may pass around guide rollers 8 suitably arranged within the cabinet 2 so that the film passes upwardly and downwardly in vertically arranged folds or loops as seen for instance in Figure 1. Alternatively the film may be arranged in any other suitable form to permit a relatively long band of film to be employed and accommodated in a relatively small area. The said guide rollers 8 are preferably provided at each end with flanges the inner faces of which are bevelled or inclined inwardly towards the periphery of the roller to prevent catching or jamming of the film 7 against the flanges and to reduce friction to a minimum.

In order to present the pictures on a sufficiently large scale, mirrors or reflectors 9 may be provided and interposed between the projecting lens 11 and the screen 12 to thereby amplify the dimensions of the illustration thrown onto the screen. The projection ray or beam is indicated diagrammatically by broken lines in Figure 1.

The absorbent screen 12 may be fastened to the wall 13 of the cabinet in any suitable manner so as to extend across an opening 14 formed in said wall whereby the image thrown onto the screen is clearly visible from the exterior of the cabinet.

The screen 12 is maintained in the desired moistened or saturated condition by the application thereto of a suitable oily liquid or like substance as aforesaid and if in a liquid state this impregnating substance may be supplied continuously to the screen by means of one or more conductors, such as wicks 15 or tubes 16. These conductors may be arranged to deliver the liquid from a reservoir 17 suitably supported as at 18 above the screen to any desired point or points around the screen. Where conductor tubes 16 are employed a control valve or cock 19 may be interposed in each of said tubes for the purpose of regulating the flow of liquid from the reservoir 17 to the screen 12. The liquid reservoir is provided with a filler opening which may be normally closed by a cap 20.

To assist the speedy and effective saturation of the screen a distributing element consisting of a strip or border 21 of absorbent material such as felt or the like, may be laid over and fastened to the marginal portion of the screen 12 the liquid being directed by the conductor wicks 15 or tubes 16 to the said strip or border 21 by which the liquid is distributed evenly around the screen soaks inwardly from the edges towards the centre thereof.

When the impregnating substance is of a relatively thick or semi liquid state as before mentioned it may be applied to the absorbent screen by hand with the aid of a brush or the like so that the screen is thoroughly saturated or impregnated and will retain its moistened state for a considerable time. Further applications of the impregnating substance may be made to the screen at requisite intervals to keep it in the desired saturated or dampened condition.

By means of a door 22 access may be had to the interior of the cabinet for changing the film 7 and for effecting adjustments and general inspection purposes. The top of the cabinet may also be provided with a flap or door 23 to permit of speedy access to the liquid reservoir 17 for replenishing the supply of liquid therein.

The cabinet 2 may be provided with suitable electric connections whereby the cinematograph or like machine can be supplied with electric current from a suitable source such as a plug or adapter as indicated at 24. A stopping and starting switch and other desired accessories may also be provided as and where desired.

Figure 3:
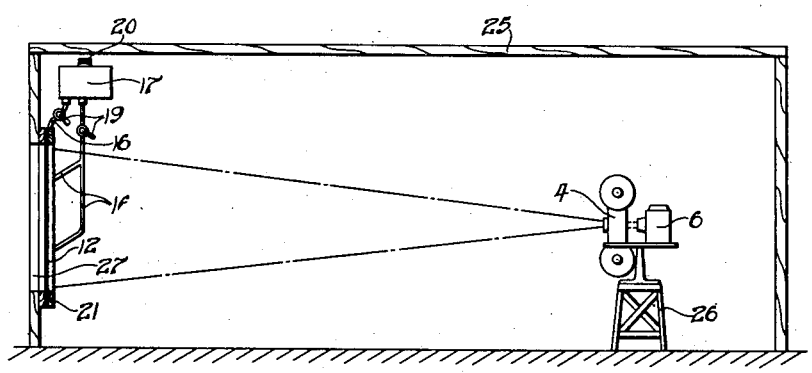
Figure 3 is a diagrammatic view in elevation showing apparatus operating in accordance with the invention and suitable for exhibiting larger illustrations at a comparatively long range.

In certain instances it may be desirable to project the pictures or announcements onto the saturated screen from a comparatively long range and suitable apparatus for such purposes may be installed in any desired position. In this case the projecting machine may be housed in a room or enclosure 25 having an opening 27 over which the screen 12 extends as indicated diagrammatically in Figure 3. Accordingly the mechanism 4 and the projecting lantern 6 may be mounted upon a suitable support 26 so as to project the image directly onto the absorbent screen 12 which displays the illustration clearly from the outside of the enclosure 25. The liquid reservoir 17, conductors 16 and other appurtenances as previously mentioned may also be provided in this example to apply liquid to the screen 12 or the impregnating substance may be applied to the screen by hand as aforesaid.

In operation the film 7 passes through the cinematograph or like machine for the projection of the illustration onto the screen 12 the impregnation of which with the oily substance renders it translucent to the projected light rays which pass through and brilliantly illuminate the screen. The image thus thrown onto the screen 12 from the interior of the cabinet or enclosure may be clearly observed from the exterior thereof in daylight and without the aid of a specially darkened apartment as is ordinarily necessary in moving picture projection. The apparatus is thus highly suited for advertising and like purposes under lighting conditions where the display of such illuminated announcements is impracticable with ordinary cinematograph and the like and the cost of existing apparatus for displaying luminous pictures in daylight is prohibitive.

Having now described my invention what I claim as new and desire to secure by Letters Patent is:—

1. In a screen to be used for day light exhibition of motion pictures, including a fabric section to be impregnated with a fluid for rendering the same translucent, and a margin of absorbent material on such fabric section for delivering the fluid to the latter.

2. A motion picture screen, including a fabric section having a marginal edge of absorbent material, and means for delivering a fluid to such edge of absorbent material.

3. A motion picture screen, comprising a section of fabric, an edge of absorbent material secured thereto, a liquid containing tank, and means for delivering said liquid to such absorbent edge, whereby the liquid may be delivered to the screen proper from the edges toward the center.

In testimony whereof I affix my signature.

WILLIAM C. CARROLL.

Witness:
VICTOR J. KELSON.